US011068726B1

(12) United States Patent
Silver et al.

(10) Patent No.: US 11,068,726 B1
(45) Date of Patent: Jul. 20, 2021

(54) STATIC OBSTACLE DETECTION

(71) Applicant: Waymo LLC, Mountain View, CA (US)

(72) Inventors: David Harrison Silver, Millbrae, CA (US); Jonathan Baldwin Dowdall, Oakland, CA (US); David Ian Ferguson, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 184 days.

(21) Appl. No.: 16/244,554

(22) Filed: Jan. 10, 2019

Related U.S. Application Data

(63) Continuation of application No. 15/094,776, filed on Apr. 8, 2016, now Pat. No. 10,204,278, which is a continuation of application No. 14/099,004, filed on Dec. 6, 2013, now Pat. No. 9,335,766.

(51) Int. Cl.
*G06K 9/48* (2006.01)
*G06K 9/00* (2006.01)
*G01V 11/00* (2006.01)
*G01S 13/04* (2006.01)
*G05D 1/02* (2020.01)
*G01S 13/931* (2020.01)
*G06K 9/62* (2006.01)
*G05D 1/00* (2006.01)
*G01S 19/13* (2010.01)
*G01S 17/04* (2020.01)
*G01S 17/931* (2020.01)

(52) U.S. Cl.
CPC .......... *G06K 9/00805* (2013.01); *G01S 13/04* (2013.01); *G01S 13/931* (2013.01); *G01S 17/04* (2020.01); *G01S 17/931* (2020.01); *G01S 19/13* (2013.01); *G01V 11/00* (2013.01); *G05D 1/0088* (2013.01); *G05D 1/021* (2013.01); *G05D 1/0246* (2013.01); *G06K 9/628* (2013.01); *G06K 9/6215* (2013.01); *G06K 9/6277* (2013.01); *G05D 1/0238* (2013.01); *G05D 2201/0213* (2013.01)

(58) Field of Classification Search
CPC ............................ G06K 9/00805; G01S 13/04
See application file for complete search history.

(56) References Cited

U.S. PATENT DOCUMENTS

| 6,535,114 | B1 * | 3/2003 | Suzuki ...................... G06T 7/20 340/435 |
| 6,680,689 | B1 * | 1/2004 | Zoratti .................. B60Q 9/008 342/70 |
| 6,834,232 | B1 | 12/2004 | Malhotra |
| 8,259,998 | B2 | 9/2012 | Okugi et al. |
| 2006/0178830 | A1 | 8/2006 | Sherony |

(Continued)

*Primary Examiner* — Jess Whittington
(74) *Attorney, Agent, or Firm* — McDonnell Boehnen Hulbert & Berghoff LLP

(57) ABSTRACT

A vehicle is provided that may distinguish between dynamic obstacles and static obstacles. Given a detector for a class of static obstacles or objects, the vehicle may receive sensor data indicative of an environment of the vehicle. When a possible object is detected in a single frame, a location of the object and a time of observation of the object may be compared to previous observations. Based on the object being observed a threshold number of times, in substantially the same location, and within some window of time, the vehicle may accurately detect the presence of the object and reduce any false detections.

20 Claims, 6 Drawing Sheets

(56) References Cited

U.S. PATENT DOCUMENTS

| | | | |
|---|---|---|---|
| 2007/0046450 A1* | 3/2007 | Iwama | G01S 11/12 340/436 |
| 2009/0033745 A1* | 2/2009 | Yeredor | G08B 13/19682 348/152 |
| 2010/0104199 A1* | 4/2010 | Zhang | G08G 1/165 382/199 |
| 2010/0202657 A1* | 8/2010 | Salgian | G06K 9/00369 382/103 |
| 2011/0187863 A1* | 8/2011 | Glander | G06K 9/00805 348/148 |
| 2011/0293190 A1 | 12/2011 | O'Callaghan | |
| 2012/0221168 A1* | 8/2012 | Zeng | B60W 30/16 701/1 |
| 2012/0269382 A1 | 10/2012 | Kiyohara | |
| 2013/0031045 A1* | 1/2013 | James | G06K 9/00805 706/52 |
| 2013/0216094 A1 | 8/2013 | Delean | |
| 2013/0301876 A1 | 11/2013 | Hugosson | |
| 2014/0002647 A1* | 1/2014 | Xu | G06K 9/6284 348/143 |
| 2014/0292554 A1* | 10/2014 | Smith | B60K 31/0008 342/27 |

\* cited by examiner

STATIC OBSTACLE DETECTION

CROSS-REFERENCE TO RELATED APPLICATIONS

The present application is a continuation of U.S. patent application Ser. No. 15/094,776, filed Apr. 8, 2016, which is a continuation of U.S. patent application Ser. No. 14/099,004, filed Dec. 6, 2013 (now U.S. Pat. No. 9,335,766), all of which are entirely incorporated by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

For autonomous vehicles, tracking dynamic objects is a standard practice, but such practice my not be applied to distinguish between static and dynamic objects. Fusion based practices, which combine data over time, or a series of detentions may not effectively handle circumstances in which a dynamic obstacle first appears static and then subsequently moves. Beneficially, the methods and systems described herein may help an autonomous vehicle distinguish between static and dynamic objects.

In a first aspect, a method is provided. The method may include receiving sensor data associated with a vehicle. The sensor data may include a plurality of frames of sensor data indicative of an environment, and the vehicle may be configured to operate in an autonomous mode in the environment. The method may also include comparing, by a computing device, a first respective frame of the plurality of frames of sensor data that includes an object to other respective frames of the plurality of frames of sensor data that include a second object so as to determine: (i) whether a location of the object in the first respective frame of the plurality of frames of sensor data is substantially the same as a location of the second object in the other respective frames of the plurality of frames of sensor data, and (ii) a time window indicative of a time between collecting the first respective frame of the plurality of frames of sensor data that includes the object and collecting the other respective frames of the plurality of frames of sensor data that include the second object. The method may additionally include making a determination that the object in the first respective frame of the plurality of frames of sensor data is the same as the second object in the other respective frames of the plurality of frames of sensor data based on: (i) the second object being present more than a threshold number of times in the other respective frames of the plurality of frames of the sensor data, (ii) the location of the object in the first respective frame of the plurality of frames of sensor data being substantially the same as the location of the second object in the other respective frames of the plurality of frames of sensor data, and (iii) the time window being greater than a time threshold.

In a second aspect, a vehicle is provided. The vehicle may include a computer system. The computer system may be configured to receive sensor data associated with the vehicle. The sensor data may include a plurality of frames of sensor data indicative of an environment, and the vehicle may be configured to operate in an autonomous mode in the environment. The computer system may also be configured to compare a first respective frame of the plurality of frames of sensor data that includes an object to other respective frames of the plurality of frames of sensor data that include a second object so as to determine: (i) whether a location of the object in the first respective frame of the plurality of frames of sensor data is substantially the same as a location of the second object in the other respective frames of the plurality of frames of sensor data, and (ii) a time window indicative of a time between collecting the first respective frame of the plurality of frames of sensor data that includes the object and collecting the other respective frames of the plurality of frames of sensor data that include the second object. The computer system may additionally be configured to make a determination that the object in the first respective frame of the plurality of frames of sensor data is the same as the second object in the other respective frames of the plurality of frames of sensor data based on: (i) the second object being present more than a threshold number of times in the other respective frames of the plurality of frames of the sensor data, (ii) the location of the object in the first respective frame of the plurality of frames of sensor data being substantially the same as the location of the second object in the other respective frames of the plurality of frames of sensor data, and (iii) the time window being greater than a time threshold.

In a third aspect, a non-transitory computer readable medium having stored therein instructions that when executed by a computer system in a vehicle, cause the computer system to perform functions is disclosed. The functions may include receiving sensor data associated with the vehicle. The sensor data comprises a plurality of frames of sensor data indicative of an environment, and the vehicle is configured to operate in an autonomous mode in the environment. The functions may also include comparing a first respective frame of the plurality of frames of sensor data that includes an object to other respective frames of the plurality of frames of sensor data that include a second object so as to determine: (i) whether a location of the object in the first respective frame of the plurality of frames of sensor data is substantially the same as a location of the second object in the other respective frames of the plurality of frames of sensor data, and (ii) a time window indicative of a time between collecting the first respective frame of the plurality of frames of sensor data that includes the object and collecting the other respective frames of the plurality of frames of sensor data that include the second object. The object may include an object type, and the second object may include the same object type. The functions may additionally include making a determination that the object in the first respective frame of the plurality of frames of sensor data is the same as the second object in the other respective frames of the plurality of frames of sensor data based on: (i) the second object being present more than a threshold number of times in the other respective frames of the plurality of frames of the sensor data, (ii) the location of the object in the first respective frame of the plurality of frames of sensor data being substantially the same as the location of the second object in the other respective frames of the plurality of frames of sensor data, and (iii) the time window being greater than a time threshold.

In a fourth aspect a system is disclosed. The system may include a means for receiving sensor data associated with a vehicle. The sensor data may include a plurality of frames of sensor data indicative of an environment, and the vehicle may be configured to operate in an autonomous mode in the environment. The system may also include a means for comparing a first respective frame of the plurality of frames of sensor data that includes an object to other respective frames of the plurality of frames of sensor data that include a second object so as to determine: (i) whether a location of the object in the first respective frame of the plurality of frames of sensor data is substantially the same as a location of the second object in the other respective frames of the plurality of frames of sensor data, and (ii) a time window indicative of a time between the first respective frame of the plurality of frames of sensor data that includes the object and the other respective frames of the plurality of frames of sensor data that include the second object. The system may additionally include a means for making a determination that the object in the first respective frame of the plurality of frames of sensor data is the same as the second object in the other respective frames of the plurality of frames of sensor data based on: (i) the second object being present more than a threshold number of times in the other respective frames of the plurality of frames of the sensor data, (ii) the location of the object in the first respective frame of the plurality of frames of sensor data being substantially the same as the location of the second object in the other respective frames of the plurality of frames of sensor data, and (iii) the time window being greater than a time threshold.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
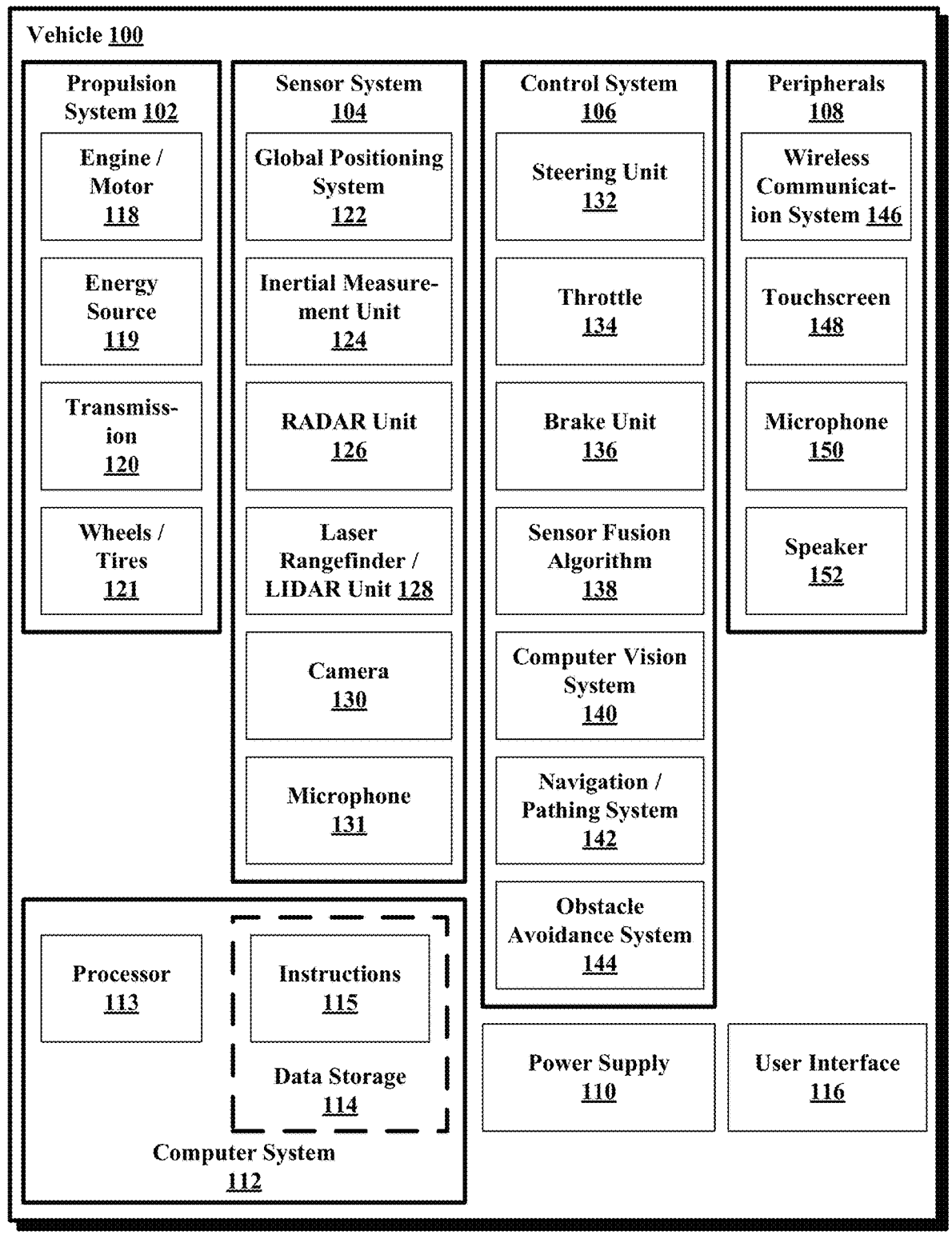
FIG. 1 illustrates a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, knowing or recognizing the presence of objects in an environment of the vehicle may be helpful. For example, autonomous vehicles may need to quickly observe, perceive, and understand static obstacles in their environment in order to properly react to their presence. In some circumstances, the presence of an object in an environment may have an implied semantic meaning (e.g., lane markers, retro-reflectors, or construction cones may all specify lane boundaries) so false positive detections may cause improper reactions or decisions to be made by the autonomous vehicle; thus the reduction or elimination of false positive detection may improve performance of the autonomous vehicle. One common source of false positives includes dynamic obstacles, which may, in a single sensor frame, appear to be a certain static obstacle, but in reality may not be.

While autonomous vehicles generally may have the capability to follow dynamic objects over time based on outputs from sensors, autonomous vehicles may not apply such capabilities to distinguish between static and dynamic objects. Some autonomous vehicles may employ systems and methods that may allow the autonomous vehicle to discriminate between a specific class of objects that the autonomous vehicle is interested in and other classes of static and dynamic objects. However, such systems and methods may require more complex detectors in order to properly distinguish between the static and dynamic objects in the same class (e.g., a piece of a car and a construction cone). Additionally, the generally known data fusion based approaches, which either combine (i) raw data over time or (ii) a series of detections (each from a small time slice) over time, may improve the accuracy of static obstacle classification, but may not accurately handle circumstances in which a dynamic obstacle first appears as a static obstacle and then becomes dynamic or moves over time.

Disclosed embodiments relate to an autonomous vehicle that may, given a pre-existing detector for a class of static obstacles or objects (e.g. lane markings, retro-reflectors, or construction cones), apply the detector to individual frames of sensor data. When a possible object is detected in a single frame, the location of the object and time of observation of the object is compared to previous observations. The autonomous vehicle may determine a detection to be valid when the same object is observed some number of times, in the approximately same location, and within a predetermined window of time. In this example, a single false detection of a moving obstacle may not appear multiple times in the same place, and false positive detections from dynamic obstacles can be reduced.

Utilizing the methods and systems described herein may facilitate the task of image processing in an autonomous vehicle. By taking advantage of the fact that objects an autonomous vehicle may desire to detect are static, false positives from dynamic obstacles may be more easily eliminated and possibly without having to construct or extract discriminating features. This may allow detectors in an autonomous vehicle to be simpler to design and implement and be less computationally intensive, while still reducing the number of false positive detections.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
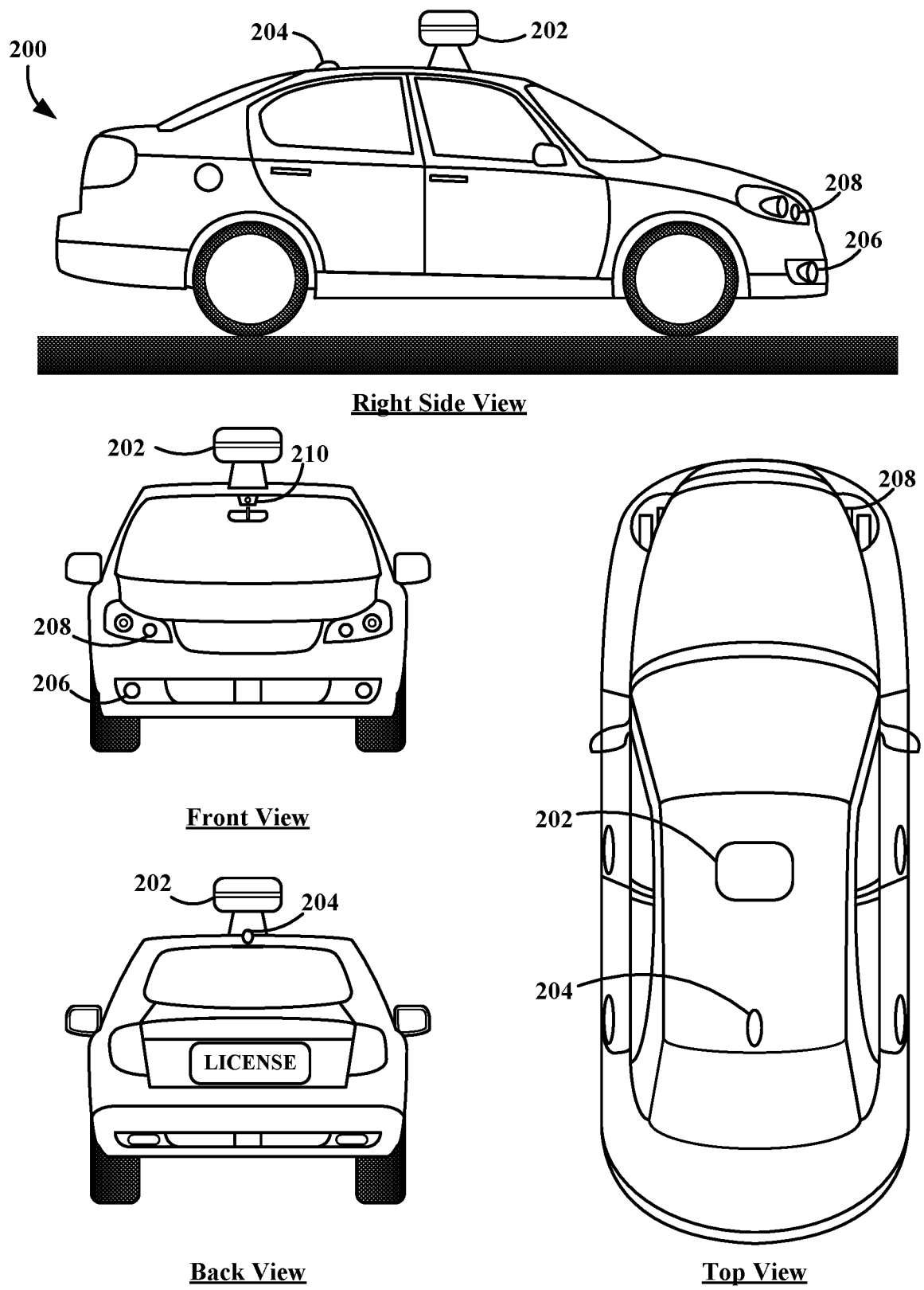
FIG. 2 illustrates a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
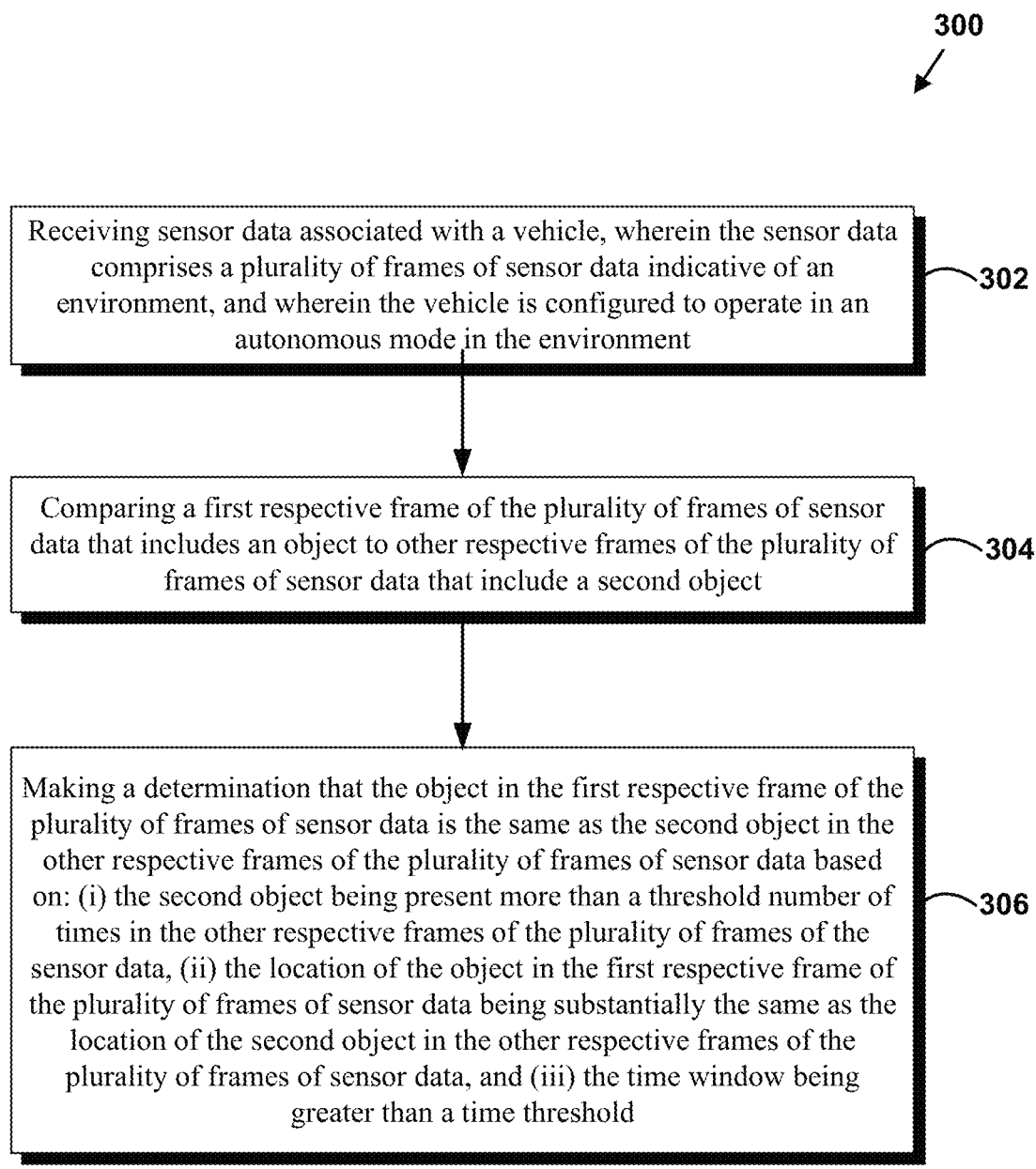
FIG. 3 illustrates a block diagram of a method, in accordance with an example embodiment.

In FIG. 3, a method 300 is provided that may accurately and efficiently detect static obstacles, in accordance with an example embodiment. The vehicle described in this method may be vehicle 100 and/or vehicle 200 as illustrated and described in reference to FIGS. 1 and 2, respectively, or components of the vehicle 100 or vehicle 200. For example, the processes described herein may be carried out by RADAR unit 126, LIDAR unit 128, and/or camera 130 mounted to an autonomous vehicle (e.g., vehicle 200) in communication with computer system 112, sensor fusion algorithm 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Initially, at block 302, method 300 of FIG. 3 includes receiving sensor data associated with a vehicle. The sensor data may include a plurality of frames of sensor data indicative of the environment in which the vehicle is operating. As previously noted, the vehicle may be the vehicle described in reference to FIGS. 1 and 2 and may be configured to operate in an autonomous mode in the environment.

Figure 4A:
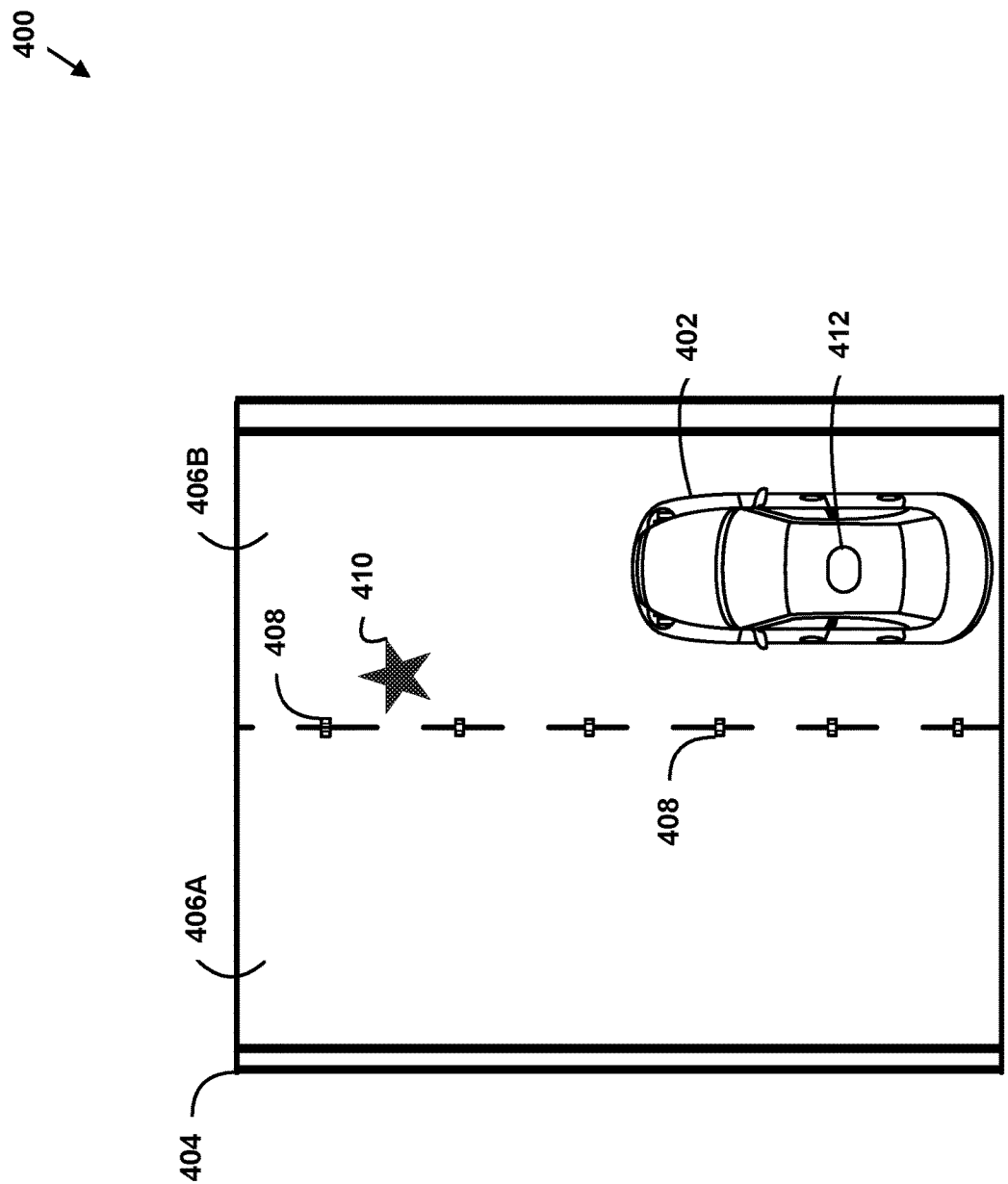
FIG. 4A illustrates an operating environment, according to an example embodiment.

The environment may be any environment in which the vehicle may be operating autonomously such as environment 400 of FIG. 4A. As shown in FIG. 4A, vehicle 402 may be operating in an environment 400 that includes vehicle 402, a two-lane highway 404 with lanes of travel 406A, 406B, a plurality of lane markers 408, and an undetermined object 410 that is substantially located within lane of travel 406B of the highway 404. Note, within the context of this disclosure substantially may include being exact and/or being one or more deviations from exact. Accordingly, in some examples unknown object 410 may be located completely within lane of travel 406B and in others partially located within lane of travel 406B. For instance unknown object 410 may be located within 1 foot, 2 feet, or a range of 3-5 feet in the lane. In other instances, the unknown object may be positioned such that it is overlaying the lane, on the curb, or in the shoulder area of highway 404, etc. Vehicle 402 may operate in other environments similar to environment 400 as well.

The sensor data may include any data indicative of environment 400. The sensor data may encompass various types of data, may be of various file formats, and may be stored to various mediums, whether those types of data, file formats, and mediums are known or have yet to be developed. For example, the sensor data may include one or more digital photographs or one or more digital graphics that may represent environment 400.

Figure 4B:
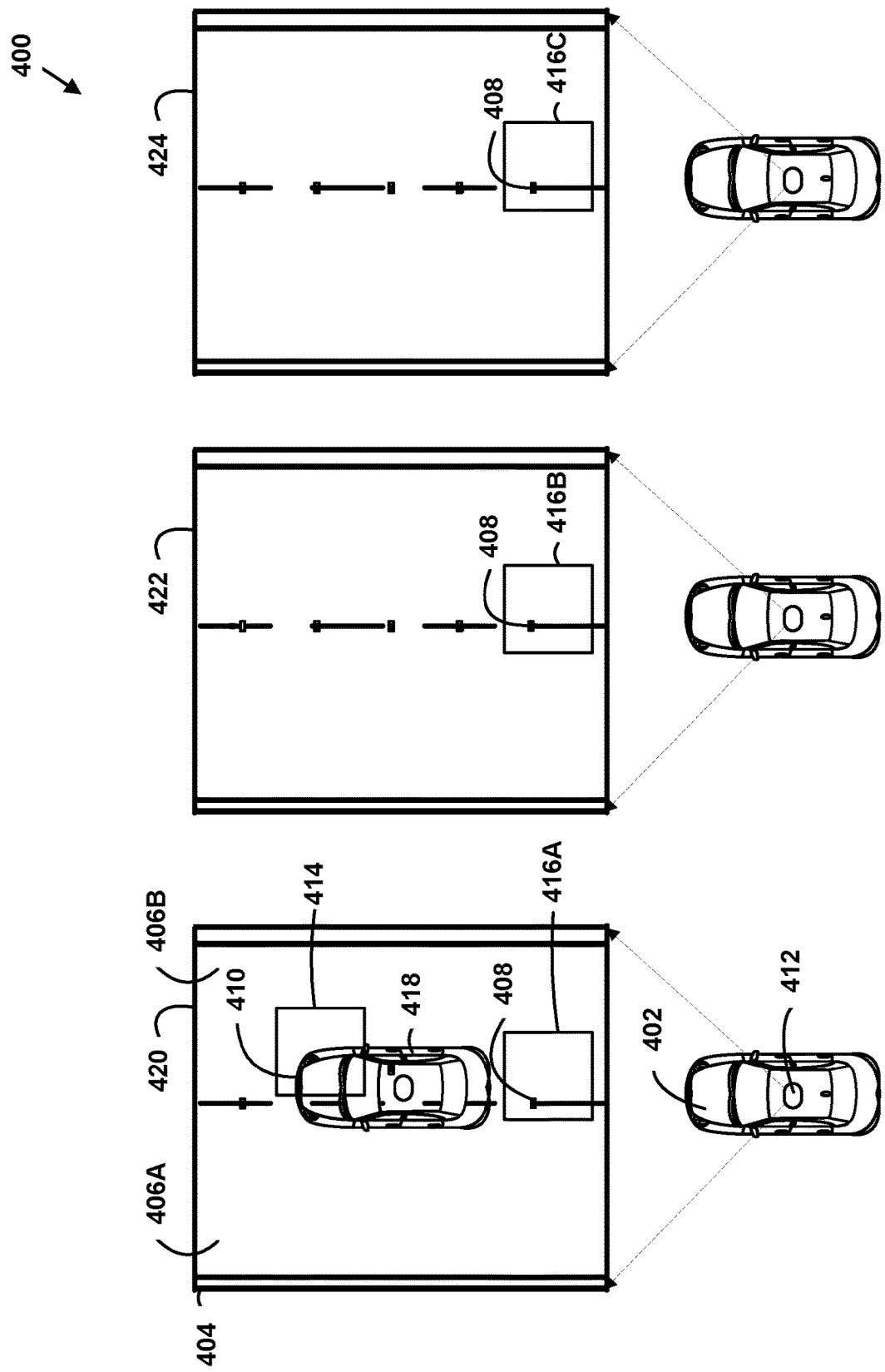
FIG. 4B illustrates an operating scenario, according to an example embodiment.

The sensor data may also include a plurality of frames of sensor data that is indicative of the environment (e.g., shown as 420, 422, 424 in FIG. 4B). Taken together, the plurality of frames of data may be indicative of a time period during which the sensor data was acquired or a range within which sensor data was acquired within the environment. For instance, the plurality of frames of sensor data may include sensor data that may be obtained at different times during a particular day in environment 400, and may include a combination of data collected by sensors of the vehicle 402 (such as any types of data described as being collected by sensors of the vehicle 100 in FIG. 1, for example).

To obtain the plurality of frames of sensor data, vehicle 402 may be continuously scanning environment 400 as the vehicle 402 operates. The vehicle may utilize a large number of scans of the environment or periodic scans of the environment using various sensors when obtaining the sensor data. Successive scans may be multiple scans by various sensors occurring over time and may be continuous or may occur in intervals. For example, the sensor data obtained in environment 400 may be obtained using sensor system 412 utilizing successive scans every few milliseconds as vehicle 402 operates in environment 400 during the particular day. Other timing may be used as well.

In other examples, the vehicle may utilize a more directed approach to obtain the sensor data. For instance, the vehicle may determine a location of interest and obtain the data based on the determined location of interest. Referring again to FIG. 4A, vehicle 402 may determine a location of interest to be a particular portion of the highway 404, such as lane of travel 406b. Knowing where lane of travel 406b is on highway 404 and where lane of travel 406b is in relation to itself, vehicle 402 may utilize such information and cause the sensors of sensor system 412 to obtain data only from the particular lane, lane 406b. For instance, vehicle 402 may determine or receive information indicating that lane of travel 406b may become obstructed within the next 2 feet by unknown object 410. Accordingly, vehicle 400 may determine the location of interest to be directly in front of vehicle 400 within a range of 2 feet. Vehicle 402 may then operate its one or more sensors of sensor system 412 in the manner noted above to obtain relevant sensor data.

In other examples, some or all of the plurality of frames of sensor data may be received by the vehicle, such as from another vehicle that may be operating in the environment (not shown in FIG. 4A). The received sensor data may include all of the frames of sensor data obtained by the vehicle or alternatively, may only include some of the frames of sensor data the vehicle may obtain. In circumstances when only part of the sensor data is received, vehicle 402 may then combine the received data with data it obtained using its sensor system 412.

Referring to FIG. 4B, illustrated is an operating scenario, according to an example embodiment. In the scenario, vehicle 402 may determine that it wants to prepare to change lanes from lane of travel 406b to lane of travel 406a and, in so doing, may determine that the lane markers 408 that divide the lanes 406a, 406b are important. Accordingly, using a retro-reflector detector or sensor of sensor system 412 that is configured to detect lane markers, vehicle 402 may sense highway 404 of environment 400 to detect any present lane markers. In the example shown in FIG. 4B, vehicle 402 may first detect potential lane marker objects in areas 414 and 416A, and as vehicle 402 continues to operate 402, vehicle 402 may continue to obtain relevant sensor data. In sum, vehicle 402 may obtain three frames of sensor data: 420, 422, 424 that each may include detections of a potential lane marker. Potential lane marker 408 may have been detected in area 416A, 416B, and 416C in frames of sensor data 420, 422, and 424, respectively. And potential lane marker 410 may have been detected in area 414 in frame of sensor data 420. Accordingly, after obtaining the relevant sensor data, vehicle 402 may have detected unknown object 410 of FIG. 4A to be a potential lane marker 410 of FIG. 4B.

Note, in FIG. 4B the sensor data includes the image shown above the dotted arrows and does not include vehicle 402. Vehicle 402 is shown for explanation purposes only and is not intended to be part of the sensor data. In practice, the sensor data may be obtained in front of, behind, or any degree in-between, from the vehicle 402 and thus may not include data representing the vehicle itself. However, in some examples, a portion of vehicle 402 may be included in the sensor data.

At block 304, method 300 includes comparing a first respective frame of the plurality of frames of sensor data that includes an object to other respective frames of the plurality of frames of sensor data that include a second object. The objects may be any object located in the environment of the vehicle. In the scenario illustrated in FIG. 4B, because vehicle 402 is operating a sensor configured to detect lane markers, the object may be lane markers 408 or unknown object 410, for example.

The comparison may be made, for example, using a computer system similar to or the same as computer system 112 as described in FIG. 1. In general, the comparison may be made employing any data processing methods or systems that are now known or may be later developed. For example, in some comparisons, spatial data structures, such as a two-dimensional (2D) occupancy grids, may be employed to speed up the matching of new objects with prior observations.

Referring again to the scenario shown in FIG. 4B, vehicle 402 may compare each frame of sensor data 420, 422, 424—all of which have at least one potential detection of an object (the lane marker)—to one another to determine similarities between the frames of data.

Based on the comparison, the vehicle may, for example, determine whether a location of the object in the first respective frame of the sensor data is substantially the same as a location of the second object in the other respective frames of sensor data. The vehicle may also determine a time window indicative of a time between the first respective frame of the plurality of frames of sensor data that includes the object and the other respective frames of the plurality of frames of sensor data that include the second object.

Accordingly, and again referring to the scenario illustrated in FIG. 4B for example, vehicle 402 may determine whether the potential lane marker 408 detected in area 416A and potential lane marker 410 of area 414 of sensor data 420, is in substantially the same location as potential lane marker 408 detected in area 416B in sensor data 424 and in substantially the same location as potential lane marker 408 detected in areas 416C in sensor data 426. Additionally, vehicle 402 may determine that frames of sensor data 420, 422 and 424 was obtained within a time window of 2 milliseconds.

Once the respective frames of sensor data have been compared, method 300, at block 306, includes making a determination that the first object in the first frame of the plurality of frames of sensor data is the same as the second object in the other respective frames of sensor data. The vehicle may make the determination based on the second object being detected more than a threshold number of times in the other respective frames of the plurality of frames of sensor data; the location of the object in the first respective frame of the plurality of frames of the sensor data being substantially the same as the location of the second object in the other respective frames of the plurality of frames of sensor data; and the time window being greater than a time threshold. Similar to the comparison performed at block 304, the determinations made at block 306 may be performed using a computer system the same as or similar to that of computer system 112.

The threshold number of detections and threshold time may be any pre-determined threshold that may serve to facilitate the accurately detecting the object. The thresholds may be determined based on prior detections or operations in similar environments. For example, in the scenario of FIG. 4B, the threshold number of times may be 3 and the threshold time may be 2 milliseconds because in a similar operating scenario (not shown), vehicle 402 may have determined that lane markers tend to be detected three to five times within a few milliseconds before moving out of range for detection. However, 3 detections and 2 milliseconds is intended only to be an example and other thresholds may be used. For instances, in some embodiments a range of 1-2 seconds may be used as a time threshold and the threshold number of detections may be variable depending on the time threshold. For example, as the time threshold decreases, the threshold number of detections may decrease. Other thresholds may be used as well.

Making such determinations may allow vehicle 402 to determine whether the original detections in area 414 and area 416A are valid or not. In other words, the determinations my allow vehicle 402 to determine whether a lane marker actually exists or whether the detection instead may represent a dynamic object that the sensor system 412 of vehicle 402 initially detected as a lane marker but in truth is not actually a lane marker.

For example, again referring to the scenario depicted in FIG. 4B, as noted above vehicle 402 may determine that it detected potential lane marker 408 in area 416A, in area 416B, and in area 416C in sensor data 420, 424, and 426, respectively within a time window of 2 milliseconds. Moreover, vehicle 402 may determine that lane marker 408 was detected substantially within the same location, and detected three times. Accordingly, because vehicle 402 detected lane marker 408 at least the threshold three times, detected lane marker 408 within substantially the same location in each of the three detections (416A, 416B, 416C), and detected lane marker 408 within the pre-determined time window, vehicle 402 may determine lane marker 406 is in fact a stationary lane marker.

Conversely, vehicle 402 may determine that unknown object and potential lane marker 410 detected in area 414 is not a stationary lane marker. Because vehicle 402 only detected unknown object and potential lane marker 410 in area 414 once, vehicle 402 may determine that, while the unknown object and potential lane marker 410 may have similar qualities and characteristics to be detected by the sensor, the actual detected object may be a dynamic object such as the headlight of another car 418 that may be operating within environment 400 along with vehicle 402. As shown, vehicle 402 detected unknown object and potential lane marker 410 in frame 420, however vehicle 402 did not detect unknown object and potential lane marker 410 in the remaining frames of sensor data 424, 426 perhaps because vehicle 418 may have continued to operate and thus the headlight did not remain in the same position long enough to be detected multiple times. Thus, vehicle 402 may disregard such detection when making a determination regarding the boundaries of the lane, for example.

Using this information, an autonomous vehicle may receive instructions and be controlled to react as necessary to avoid the confirmed object. In accordance with the original objective of vehicle 402, vehicle 402 may utilize the detection of the lane marker 408 to, for example, safely change lanes from 406b to 406a.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
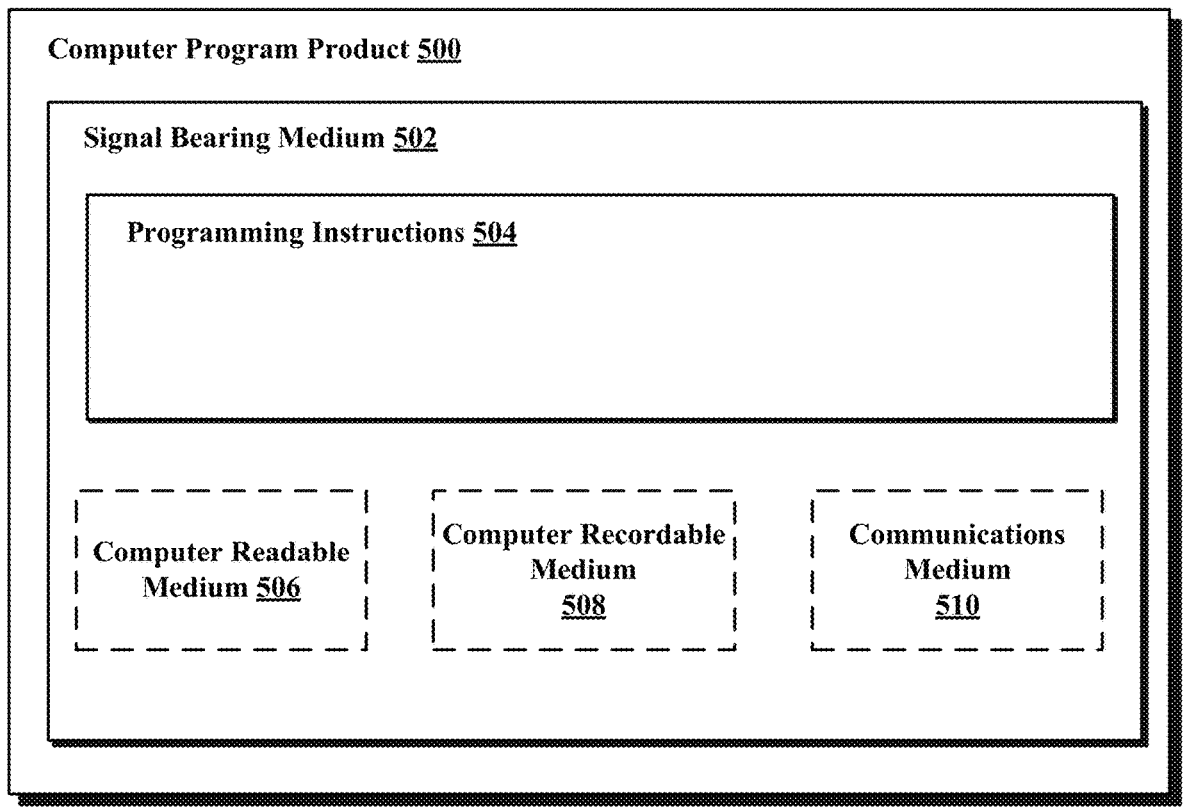
FIG. 5 illustrates a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:
receiving, by a computing device and from a sensor coupled to a vehicle, a first set of sensor data representing an environment;
detecting, using the first set of sensor data, a first object in a forward path of travel of the vehicle;
determining, using the first set of sensor data, that the first object is a stationary lane marker based on both a threshold number of detections of the first object and a threshold amount of time between an initial detection and a subsequent detection of the first object, wherein the threshold number of detections and the threshold of time between the initial detection and the subsequent detection is based on parameters corresponding to the environment;
storing, by the computing device, an indication that associates detection of the stationary lane marker with the threshold number of detections and the threshold amount of time;
receiving, by the computing device, a second set of sensor data representing the environment;
detecting, using the second set of sensor data, a second object in the forward path of travel of the vehicle;
determining, using the stored indication, that the second object is a stationary lane marker based on detecting the second object for the threshold number of detections and the threshold amount of time between an initial detection and a subsequent detection of the second object; and
controlling the vehicle in the environment based on determining that the second object is the stationary lane marker.

2. The method of claim 1, wherein receiving the first set of sensor data representing the environment comprises:
receiving the first set of sensor data from a forward-facing sensor.

3. The method of claim 2, wherein receiving the second set of sensor data representing the environment comprises:
receiving the second set of sensor data from the forward-facing sensor.

4. The method of claim 1, wherein controlling the vehicle in the environment based on determining that the second object is the stationary lane marker comprises:
causing the vehicle to navigate a path that aligns the vehicle relative to the stationary lane marker.

5. The method of claim 1, further comprising:
receiving a third set of sensor data representing the environment;
detecting, using the third set of sensor data, a third object in the path of travel of the vehicle;
determining that the third object is a third stationary lane marker based on detecting the third object for the threshold number of detections and the threshold amount of time between an initial detection and a subsequent detection of the third object.

6. The method of claim 5, further comprising:
determining a linear alignment between the stationary lane marker and the second stationary lane marker relative to a boundary of a road; and
identifying one or more additional stationary lane markers based on the linear alignment between the stationary lane marker and the second stationary lane marker.

7. A system comprising:
a sensor coupled to a vehicle;
one or more processors;
program instructions that, when executed by the one or more processors, cause the system to:
receive, from the sensor, a first set of sensor data representing an environment;
detect, using the first set of sensor data, a first object in a forward path of travel of the vehicle;
determine, using the first set of sensor data, that the first object is a stationary lane marker based on both a threshold number of detections of the first object and a threshold amount of time between an initial detection and a subsequent detection of the first object, wherein the threshold number of detections and the threshold of time between the initial detection and the subsequent detection is based on parameters corresponding to the environment;
store an indication that associates detection of the stationary lane marker with the threshold number of detections and the threshold amount of time;
receive a second set of sensor data representing the environment;
detect, using the second set of sensor data, a second object in the forward path of travel of the vehicle;
determine, using the stored indication, that the second object is a stationary lane marker based on detecting the second object both for the threshold number of detections and the threshold amount of time between an initial detection and a subsequent detection of the second object; and
control the vehicle in the environment based on determining that the second object is the stationary lane marker.

8. The system of claim 7, wherein receiving the first set of sensor data representing the environment comprises:
receiving the first set of sensor data from a forward-facing sensor.

9. The system of claim 8, wherein receiving the second set of sensor data representing the environment comprises:
receiving the second set of sensor data from the forward-facing sensor.

10. The system of claim 7,
wherein controlling the vehicle in the environment based on determining that the second object is the stationary lane marker comprises:
causing the vehicle to navigate a path that aligns the vehicle relative to the stationary lane marker.

11. The system of claim 7, wherein the system is further configured to:
receive a third set of sensor data representing the environment;
detect, using the third set of sensor data, a third object in the path of travel of the vehicle;
determine that the third object is a second stationary lane marker based on detecting the third object for the threshold number of detections and the threshold amount of time between an initial detection and a subsequent detection of the third object.

12. The system of claim 11, wherein the system is further configured to:
   determine a linear alignment between the stationary lane marker and the second stationary lane marker relative to a boundary of a road; and
   identify one or more additional stationary lane markers based on the linear alignment between the stationary lane marker and the second stationary lane marker.

13. A non-transitory computer readable medium storing instructions, that when executed by a computer system, cause the computer system to perform functions comprising:
   receiving, from a sensor coupled to a vehicle, a first set of sensor data representing an environment;
   detecting, using the first set of sensor data, a first object in a forward path of travel of the vehicle;
   determining, using the first set of sensor data, that the first object is a stationary lane marker based on both a threshold number of detections of the first object and a threshold amount of time between an initial detection and a subsequent detection of the first object, wherein the threshold number of detections and the threshold of time between the initial detection and the subsequent detection is based on parameters corresponding to the environment;
   storing an indication that associates detection of the stationary lane marker with the threshold number of detections and the threshold amount of time;
   receiving a second set of sensor data representing the environment;
   detecting, using the second set of sensor data, a second object in the forward path of travel of the vehicle;
   determining, using the stored indication, that the second object is a stationary lane marker based on detecting the second object both for the threshold number of detections and the threshold amount of time between an initial detection and a subsequent detection of the second object; and
   controlling the vehicle in the environment based on determining that the second object is the stationary lane marker.

14. The non-transitory computer readable medium of claim 13, wherein receiving the first set of sensor data representing the environment comprises:
   receiving the first set of sensor data from a forward-facing sensor.

15. The non-transitory computer readable medium of claim 14, wherein receiving the second set of sensor data representing the environment comprises:
   receiving the second set of sensor data from the forward-facing sensor.

16. The non-transitory computer readable medium of claim 13, wherein controlling the vehicle in the environment based on determining that the second object is the stationary lane marker comprises:
   causing the vehicle to navigate a path that aligns the vehicle relative to the stationary lane marker.

17. The non-transitory computer readable medium of claim 13, further comprising:
   receiving a third set of sensor data representing the environment;
   detecting, using the third set of sensor data, a third object in the path of travel of the vehicle;
   determining that the third object is a second stationary lane marker based on detecting the third object for the threshold number of detections and the threshold amount of time between an initial detection and a subsequent detection of the third object.

18. The non-transitory computer readable medium of claim 17, further comprising:
   determining a linear alignment between the stationary lane marker and the second stationary lane marker relative to a boundary of a road; and
   identifying one or more additional stationary lane markers based on the linear alignment between the stationary lane marker and the second stationary lane marker.

19. The non-transitory computer readable medium of claim 13, wherein determining that the second object is the stationary lane marker is further based on a location of the second object relative to a boundary of a road.

20. The non-transitory computer readable medium of claim 13, further comprising:
   determining that the first object is the stationary lane marker further based on a location of the first object relative to a boundary of a road.

* * * * *